(12) United States Patent
Baluja et al.

(10) Patent No.: US 7,587,461 B2
(45) Date of Patent: Sep. 8, 2009

(54) METHOD AND SYSTEM FOR ACTIVITY BASED EMAIL SORTING

(75) Inventors: Shumeet Baluja, Mountain View, CA (US); Henry A. Rowley, Mountain View, CA (US)

(73) Assignee: Google Inc., Mountain View, CA (US)

( * ) Notice: Subject to any disclaimer, the term of this patent is extended or adjusted under 35 U.S.C. 154(b) by 285 days.

(21) Appl. No.: 11/110,116

(22) Filed: Apr. 19, 2005

(65) Prior Publication Data

US 2006/0235933 A1 Oct. 19, 2006

(51) Int. Cl.
G06F 15/16 (2006.01)
(52) U.S. Cl. ..................... 709/207; 709/206
(58) Field of Classification Search .............. None
See application file for complete search history.

(56) References Cited

U.S. PATENT DOCUMENTS

| | | | | |
|---|---|---|---|---|
| 5,208,748 | A | | 5/1993 | Flores et al. ............... 364/419 |
| 5,216,603 | A | | 6/1993 | Flores et al. ............... 364/419 |
| 5,734,837 | A | | 3/1998 | Flores et al. ............... 395/207 |
| 5,999,932 | A | * | 12/1999 | Paul ............................ 707/10 |
| 6,185,551 | B1 | | 2/2001 | Birrell et al. .................. 707/3 |
| 6,571,234 | B1 | * | 5/2003 | Knight et al. .................. 707/3 |
| 6,778,941 | B1 | * | 8/2004 | Worrell et al. ............. 702/176 |
| 6,779,021 | B1 | * | 8/2004 | Bates et al. ................. 709/206 |
| 6,842,775 | B1 | * | 1/2005 | Chastain et al. ............ 709/207 |
| 2002/0161782 | A1 | * | 10/2002 | Bozionek et al. ......... 707/104.1 |
| 2003/0018706 | A1 | * | 1/2003 | Bates et al. ................. 709/203 |
| 2003/0187937 | A1 | * | 10/2003 | Yao et al. ................... 709/206 |
| 2003/0233418 | A1 | * | 12/2003 | Goldman ................... 709/206 |
| 2004/0088359 | A1 | * | 5/2004 | Simpson .................... 709/206 |
| 2005/0004989 | A1 | * | 1/2005 | Satterfield et al. ........... 709/206 |
| 2005/0004990 | A1 | * | 1/2005 | Durazo et al. .............. 709/206 |
| 2005/0149622 | A1 | * | 7/2005 | Kirkland et al. ............ 709/207 |
| 2005/0198127 | A1 | * | 9/2005 | Helland et al. ............. 709/204 |
| 2005/0204009 | A1 | * | 9/2005 | Hazarika et al. ........... 709/206 |
| 2006/0010217 | A1 | * | 1/2006 | Sood .......................... 709/206 |
| 2006/0143274 | A1 | * | 6/2006 | Schulz et al. .............. 709/206 |

OTHER PUBLICATIONS

Comer, D., et al., "Conversation-Based Mail," ACM Transactions on Computer Systems (TOCS) vol. 4, Issue 4, Nov. 1986, pp. 299-319.
Bellotti, V., et al., (2003), "Taking Email to Task: The Design and Evaluation of a Task Management Centered Email Tool," Proceedings on Human Factors in Computing Systems (CHI2003), Fort Lauderdale, Florida, Apr. 5-10, 2003, pp. 345-352.

(Continued)

*Primary Examiner*—John Follansbee
*Assistant Examiner*—Angela Widhalm
(74) *Attorney, Agent, or Firm*—Morgan, Lewis & Bockius LLP

(57) ABSTRACT

Messages of a user are ranked based on metrics derived from user actions with regard to the messages. Groupings of messages, such as conversations or a set of messages that are determined to be similar, may also be ranked. When new messages are received, their interest to the user is estimated based on rankings of messages and message groupings to which the new message is related. The new messages may be made more or less prominent based on the estimated interest to the user.

25 Claims, 8 Drawing Sheets

OTHER PUBLICATIONS

Bellotti, V. et al., "Taskmaster: Recasting Email as Task Management," PARC CSCW '02 Workshop on Redesigning Email for the 21th Century, 2002, 5 pages.

Flores, F. et al., "Computer Systems and the Design of Organizational Interaction," ACM Transactions on Information Systems, (1988), pp. 153-172.

Shepherd, A. et al., "Strudel—An Extensible Electronic Conversation Toolkit," Proceedings of the 1990 ACM Conference on Computer-Supported Cooperative Work, Los Angeles, California, 1990, pp. 93-104.

Venolia, G., et al., "Supporting Email Workflow," Technical Report MSR-TR-2001-88, Microsoft Corporation, Sep. 2001, 10 pages.

Winograd, T., (1987), "A Language/Action Perspective on the Design of Cooperative Work," Human-Computer Interaction, vol. 3 No. 1, pp. 3-30, (1987-1988). Earlier version presented at the Conference on Computer-supported Cooperative Work, Austin, pp. 203-220, Dec. 1986.

Winograd, T., "Where the Action Is," pp. 256A-260, Byte, Dec. 1988.

Zawinski, J., "Message Threading," http://www.jwz.org/doc/threading.html, pp. 1-9 (1997-2000).

* cited by examiner

FIG. 6B

| Conv1_ID (626) | Rank (627) |
|---|---|
| Msg1 | Metrics | Rank |
| ... | ... | ... |
| Msg6 | Metrics | Rank |

(628) (629) (630)

625 — Conv1 / Conv2 / ... — 624

FIG. 6C

| Msg99 (632) | Metrics (633) | Rank (634) |
|---|---|---|
| Msg100 | Metrics | Rank |
| ... | ... | ... |

| Conv1_ID (636) | Rank (637) |
|---|---|
| Conv2_ID | Rank |
| ... | ... |

| Msg1_ID (639) | Metrics (640) | Rank (641) |
|---|---|---|
| Msg2_ID | Metrics | Rank |
| ... | ... | ... |

638

METHOD AND SYSTEM FOR ACTIVITY BASED EMAIL SORTING

TECHNICAL FIELD

The disclosed embodiments relate generally to ordering electronic messages. More particularly, the disclosed embodiments relate to ordering electronic messages based on a user action's with regard to the messages.

BACKGROUND

Every day, people send and receive millions of electronic messages, such as e-mail, over computer networks for business and leisure. Indeed, e-mail (also written as "email") has become an extremely popular communication channel for people to exchange information.

A common way to sort emails is by the date and time received. However, such a sorting scheme is not always appropriate, as the emails in which the user is interested may be placed in less prominent positions under such a sorting scheme. Some email clients and web mail services also allow the user to create rules for flagging emails that satisfy certain criteria, such as a specified word or phrase appearing in the subject line of the message. However, these rules require manual creation by the user. Furthermore, these rules are static; emails that satisfy a rule are flagged regardless of whether the message is actually of interest to the user.

SUMMARY

According to an aspect of the invention, a method for providing ranking values to messages includes associating a ranking value with a received message, the ranking value having an initial value based on one or more ranking factors. At least one interaction metric associated with the received message is determined based on actions performed by a user regarding the received message. The ranking value is modified in accordance with the at least one interaction metric.

BRIEF DESCRIPTION OF THE DRAWINGS

For a better understanding of the aforementioned aspects of the invention as well as additional aspects and embodiments thereof, reference should be made to the detailed description of the embodiments below, in conjunction with the following drawings in which like reference numerals refer to corresponding parts throughout the figures.

FIGS. 6B-6E are block diagrams illustrating exemplary data structures for storing messages, conversations, and associated interaction metrics and ranking values, according to some embodiments of the invention.

DETAILED DESCRIPTION OF THE EMBODIMENTS

Electronic messages of a user are each associated with a ranking value based on one or more interaction metrics. The ranking value serves as a proxy for the user's interest in the message. Whenever a new message is received, its interest to the user is estimated based on ranking values of messages related to the new message. The related messages may be messages of a same conversation as the new message and/or messages that are similar to new message. By estimating the interest to the user of new messages, they can be sorted and/or marked based on the estimated interest. The new messages that are estimated to be of high interest to the user may be displayed more prominently than new messages estimated to be of lower interest to the user.

Figure 1:
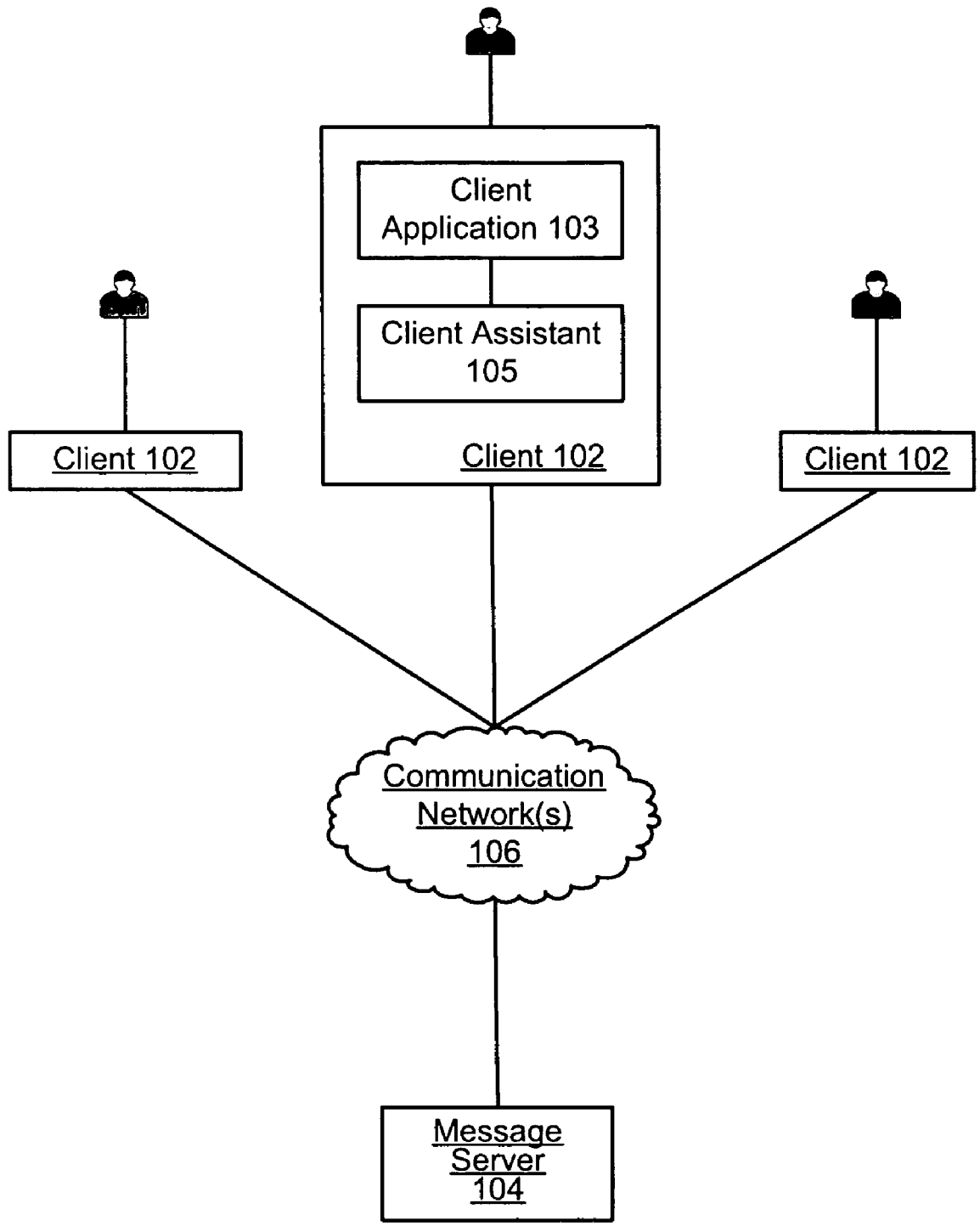
FIG. 1 is a block diagram of an exemplary network environment, according to some embodiments of the invention.

FIG. 1 illustrates an exemplary network environment, according to some embodiments of the invention. The network environment includes one or more clients 102 and a message server 104. Client 102 includes a client application 103, such as a web browser or an electronic messaging program. Client 102 also may include a client assistant 105. The client assistant 105 may be a part of the client application 103 or a distinct application that is coupled to the client application 103. For instance, the client assistant 105 may be executable code embedded in a web page, which is then executed by the client 102 in an environment provided by the client application 103. The network environment also includes one or more communication network(s) 106 that interconnect these components.

Client application 103 provides the user of client 102 an interface to interact with electronic messages (or "messages"). In some embodiments, electronic messages may include email messages and/or newsgroup messages. Client application 103 may include web browsers or electronic messaging programs. Examples of web browsers include Internet Explorer and Firefox. Examples of electronic messaging programs include Outlook, Outlook Express, Thunderbird, and Eudora.

In some embodiments, client application 103 is an electronic messaging program. Operations on a message may be performed at the server-side, by message server 104, or at the client-side, by the electronic messaging program 103 and/or the client assistant 105. The user interacts with the message through the interface provided by the electronic messaging program 103. Optionally, a message stored at message server 104 may be deleted from message server 104 after it is copied to a client 102.

In some embodiments, client application 103 is a web browser. A message remains on the message server 104 and operations on the message are performed by message server 104. A user of client 102 interacts with the message, directed to the user and stored on message server 104, using a Web-based interface (sometimes called "web mail"), which the user accesses through the web browser 103 and/or the client assistant 105. For simplicity of explanation, client application 103 as described below is a web browser, and thus the embodiments described below assumes a web mail interface, wherein the operations on electronic messages are performed at message server 104.

Figure 2:
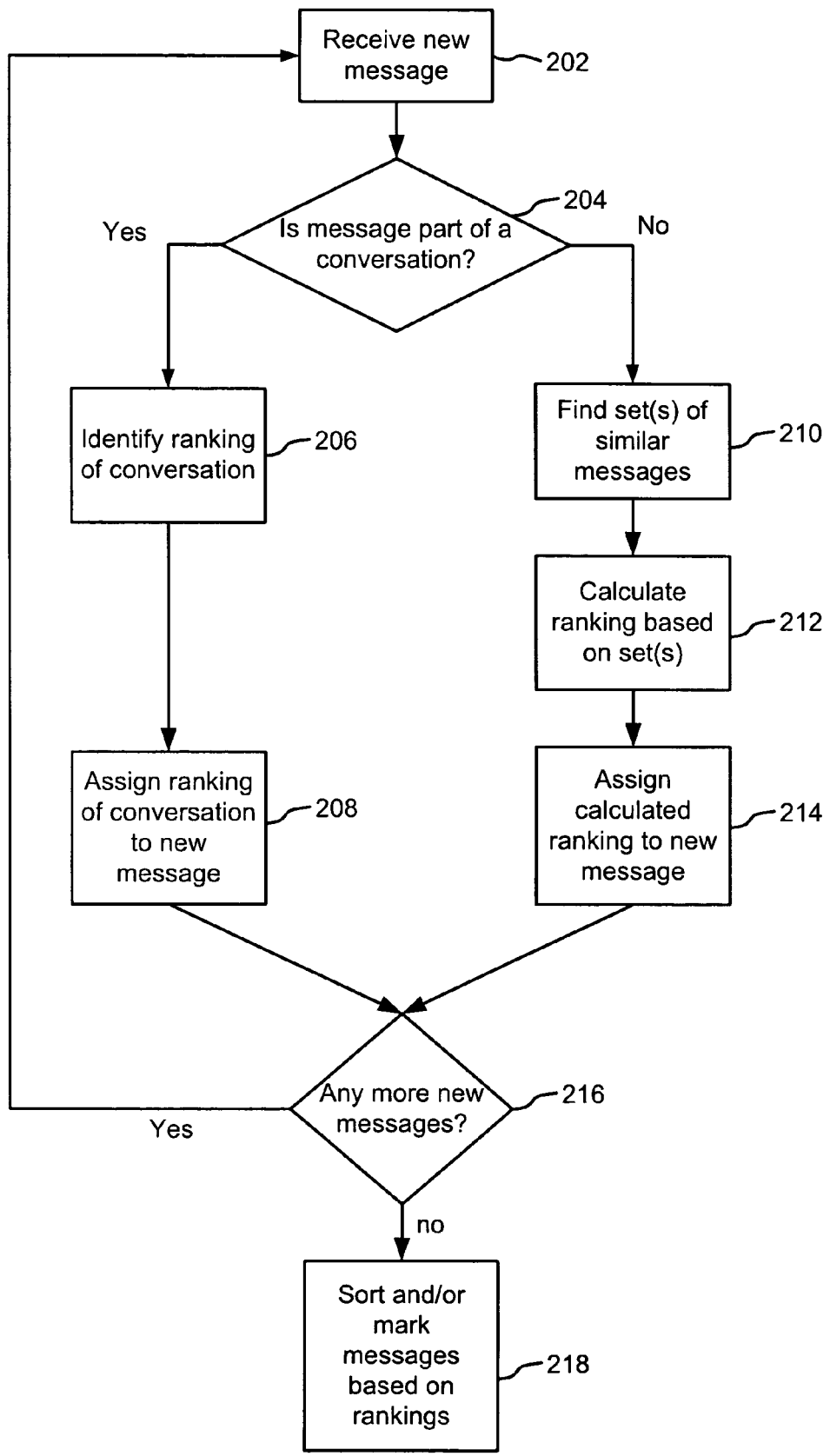
FIG. 2 is a flowchart illustrating an exemplary process for assigning to a new message a ranking value based on a ranking value of a conversation or of a set of messages that are similar to the new message, according to some embodiments of the invention.

FIG. 2 illustrates an exemplary process for assigning a ranking value to a newly received message (or "new message") directed to a user based on a composite ranking value of a conversation or of a set of similar messages, according to some embodiments of the invention. The received message, in some embodiments, may be an email message. When a new message is received by message server 104, it may be assigned a ranking value for purposes of sorting and/or marking. A ranking value is assigned to the new message based on a ranking value of a conversation to which the new message belongs or a ranking value of a set of messages that are similar to the new message. However, it should be appreciated that this assigned ranking value for the new message may be replaced by a determined ranking value that is determined based on how the user interacts with the new message, further details of which are described below in relation to FIG. 4.

The assigned ranking value serves as an initial estimate of the interest of a new message to the user, so that the new message may be sorted and/or marked based on that estimated interest to the user. Message server 104 uses the assigned ranking value to determine if the new message should be displayed more prominently relative to other messages, or marked as a message that would be of interest to the user. However, because a user has not interacted with the new message yet, there are no interaction metrics (with respect to the new message) to form a basis for determining a ranking value for the new message. Hence, the new message is assigned the composite ranking value of the conversation to which the new message belongs or the composite ranking value of a group of similar messages; the given ranking value serves as an estimate of the interest of the new message to the user until a ranking value may be determined based on user actions with regard to the message. In alternative embodiments, the assigned ranking value of a new message may be, rather than a composite ranking value, the lowest ranking value or the highest ranking value amongst messages belonging to the same conversation as the new message and/or amongst messages similar to the new message.

Message server 104 receives a new message directed to a user (202). If the new message is part of an existing conversation directed to the user (204—yes), message server 104 identifies the composite ranking value of the conversation to which the new message belongs (206). Message server 104 assigns the composite ranking value of the conversation to the new message (208). The composite ranking value of a conversation, and the process for determining such, is described in further detail below in relation to FIG. 4.

Messages directed to a user may be grouped into conversations. A conversation includes one or more related messages (e.g., covering a common topic, belonging to the same thread). In a sense, the conversation is an exchange of one or more related messages, between one or more users. In some embodiments, messages may be grouped into conversations by analyzing various parts of the messages, such as the subject line, and determining which messages are related. For example, a first message with a subject line "ABC" and a second message with a subject line "Re: ABC," where "Re:" indicates that the second message is a response to the first message, may be grouped into a conversation because the messages are related by virtue of the second message being a reply to the first message.

If the new message is not a part of an existing conversation directed to the user (204—no), message server 104 identifies a set of one or more existing messages, directed to the user, that are similar to the new message (210). In some embodiments, the set of similar messages may also include messages previously sent by the user and the conversations associated with those messages. A composite ranking value for the set of similar messages is determined based on the ranking values of the messages within the set of similar messages (218). The new message is assigned the composite ranking value of the set of similar messages (214).

The set of similar messages includes existing messages that are similar to the new message. In some embodiments, an existing message may be similar to the new message based on the content of the two messages. In some embodiments, an existing message may also be similar to the new message based on both messages having the same sender. In some embodiments, if similarity is based on content (or is based at least in part on content), the existing messages are deemed to be similar to the new message if the degree of similarity, as represented by a similarity score, is above a predefined similarity score threshold. The degree of similarity or similarity score that is based at least in part on content may be determined from one or more topics identified for the new message and existing messages after the messages are analyzed. The messages may be analyzed using techniques for identifying topic(s) for content, which are known to one of ordinary skill in the art. An example of such a technique includes keyword extraction and frequency analysis. However, it should be appreciated that the criteria for similarity described above are merely exemplary and other criteria for similarity may be included.

A new message and an existing message may be considered to have the same sender if the senders' email addresses in the two messages match. In some embodiments, the two messages may also be considered to have the same sender if the senders' email addresses in the two messages, even if different, map to the same contact in the user's list of contacts and associated email addresses, e.g., an address book.

Furthermore, it should be appreciated that "similar" messages are not necessarily part of the same conversation; messages in a conversation may belong to a single exchange of one or more messages on a common topic, while messages that are "similar" may have a degree of a similarity (which may be based at least in part on content) above a predefined threshold but do not necessarily belong to a single exchange. If no similar messages are found at 214, the new message may be assigned a default ranking value at 214.

The composite ranking value of the set of similar messages may be an average of the ranking values of the messages within the set of similar messages, where the ranking values of the messages are weighted in some way, i.e., a weighted average. In some embodiments, the ranking value of each message in the set of similar messages may be accorded equal weight. In some embodiments, ranking values of the messages within the set may be weighted differently. For example, ranking values of messages that are similar to the new message based on a same sender may be accorded more weight than ranking values of messages that are similar to the new message based on content. Furthermore, for messages that are similar to the new message based on content, the ranking values of such messages may be normalized based on the degree of similarity or similarity score. Even further, ranking values for the similar messages may be weighted based on the date and time of the message, such that more recent messages may be given more weight. However, it should be appreciated that the weighting schemes described above are merely exemplary and alternate schemes may be used.

After the new message is assigned the composite ranking value of a conversation or of a set of similar messages, if there are more new messages (216—yes), then they are received (202) and assigned ranking values as described above. If there are no more new messages (216—no), then the new messages may be sorted and/or marked based on their assigned ranking values (218). In some embodiments, a new message (and/or the conversation to which the new message belongs) may be marked by flagging, color-coding, or highlighting the new message. Furthermore, in some embodiments, only new messages with assigned ranking values above a predefined ranking threshold are marked.

Figure 3:
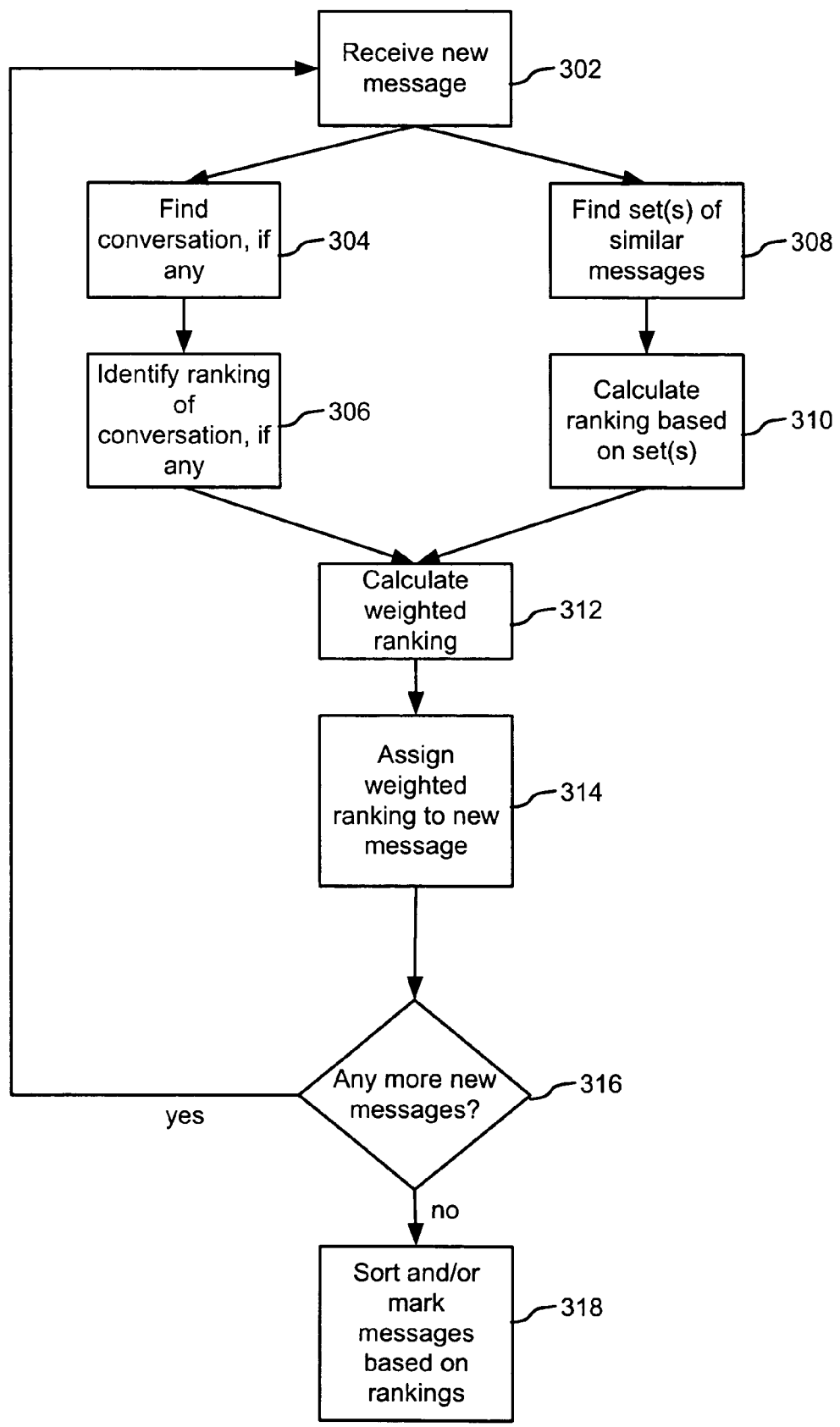
FIG. 3 is a flowchart illustrating an exemplary process for assigning to a new message a ranking value based on ranking values of a conversation and of a set of messages that are similar to the new message, according to some embodiments of the invention.

In some embodiments, some of the operations shown in FIG. 3 are performed in a different order than described above. For instance, a plurality of messages may be received prior to performing any of the processing shown in FIG. 3. Similarly, in some embodiments existing messages and new messages may be sorted and ordered together. In some embodiments, the new messages are sorted and ordered apart from the existing messages. Furthermore, if the new messages belong to conversations, the conversations may be reordered based on the ordering of the new messages. For example, a conversation that has a new message with a high ranking value will be displayed or ordered more prominently in a list of conversations than a conversation that has a new message with a low ranking value.

In some embodiments, a sender of a message may set an importance or priority level for the message. When a new message is received, assigned a ranking value, and sorted/marked, message server 104 may take the importance level set by the sender into consideration or ignore the indicator entirely. Whether the importance level is considered or ignored may be an option that the receiving user can toggle. For example, if the importance level is to be considered, the importance level may be converted to a value (e.g., high importance is converted to a value of 1, normal importance is converted to a 0, and low importance is converted to a−1), and the value may be used as a plus or minus factor on the assigned ranking value of a new message.

FIG. 3 illustrates an exemplary embodiment for assigning a ranking value to a new message directed to a user based on both the composite ranking values of an existing conversation directed to the user, to which the new message belongs, and of a set of messages directed to the user that are similar to the new message, according to some embodiments of the invention. In some embodiments, if a new message belongs to a conversation, and there are messages similar to the new message, composite ranking values of the conversation and the set of similar messages may be used together to determine a ranking value to assign to the new message for purposes of sorting and marking.

Message server 104 receives a new message directed to a user (302). The conversation to which the new message belongs, if any, is identified (304). The composite ranking value of the conversation to which the new message belongs, if any, is identified (306). The set of messages directed to the user that are similar to the new message are identified (308). In some embodiments, the set of similar messages may also include messages previously sent by the user and the conversations associated with those messages. As described above in relation to FIG. 2, messages may be "similar" based on content and/or a common sender. A composite ranking value for the set of similar messages is determined based on ranking values of the messages within the set of similar messages (310). It should be appreciated that step 306 is similar to step 206 of FIG. 2 as described above. Steps 308 and 310 are similar to steps 210 and 212, respectively, of FIG. 2 as described above.

After the composite ranking value of the conversation is identified and the composite ranking value of the set of similar messages is determined, a ranking value to be assigned to the new message is determined based on the composite ranking values of the conversation and of the set of similar messages (312). The ranking value to be assigned to the new message may be a weighted average of the composite ranking values of the conversation and of the set of similar messages. The ranking value determined based on the two composite ranking values is assigned to the new message (314). If there are more new messages (316—yes), they are received (302) and assigned ranking values as described above. If there are no more new messages (316—no), the new messages are sorted and/or marked according to their assigned ranking values (318). As with the process described above in relation to FIG. 2, it should be appreciated that the assigned ranking value for the new message may be replaced by a determined ranking value that is determined based on user actions with regard to the new message, further details of which are described below in relation to FIG. 4.

In the processes of FIGS. 2 and 3, a new message may be assigned a ranking value based on the ranking value of an existing conversation and/or a ranking value of a set of similar messages. However, there may be a new message directed to the user that is not a part of any existing conversation, nor are there existing messages that are similar (or, in some embodiments, sufficiently similar) to the new message. Under such circumstances, message server 104 may, in some embodiments, assign the new message a default ranking value for purposes of sorting and marking.

Figure 4A:
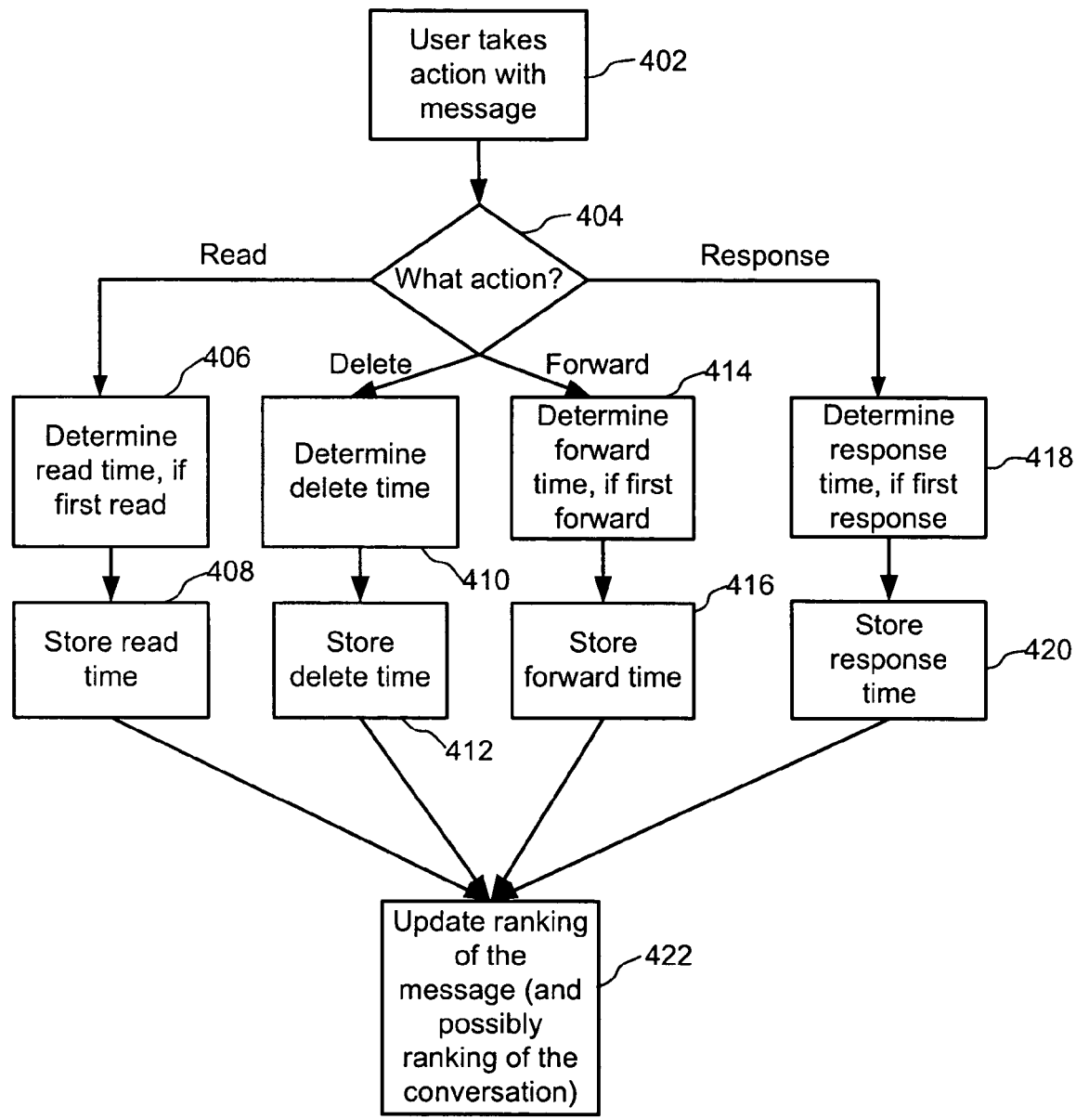
FIGS. 4A and 4B are flowcharts illustrating exemplary processes for determining interaction metrics for a message, and for determining ranking values for a message and a conversation, according to some embodiments of the invention.
Figure 4B:
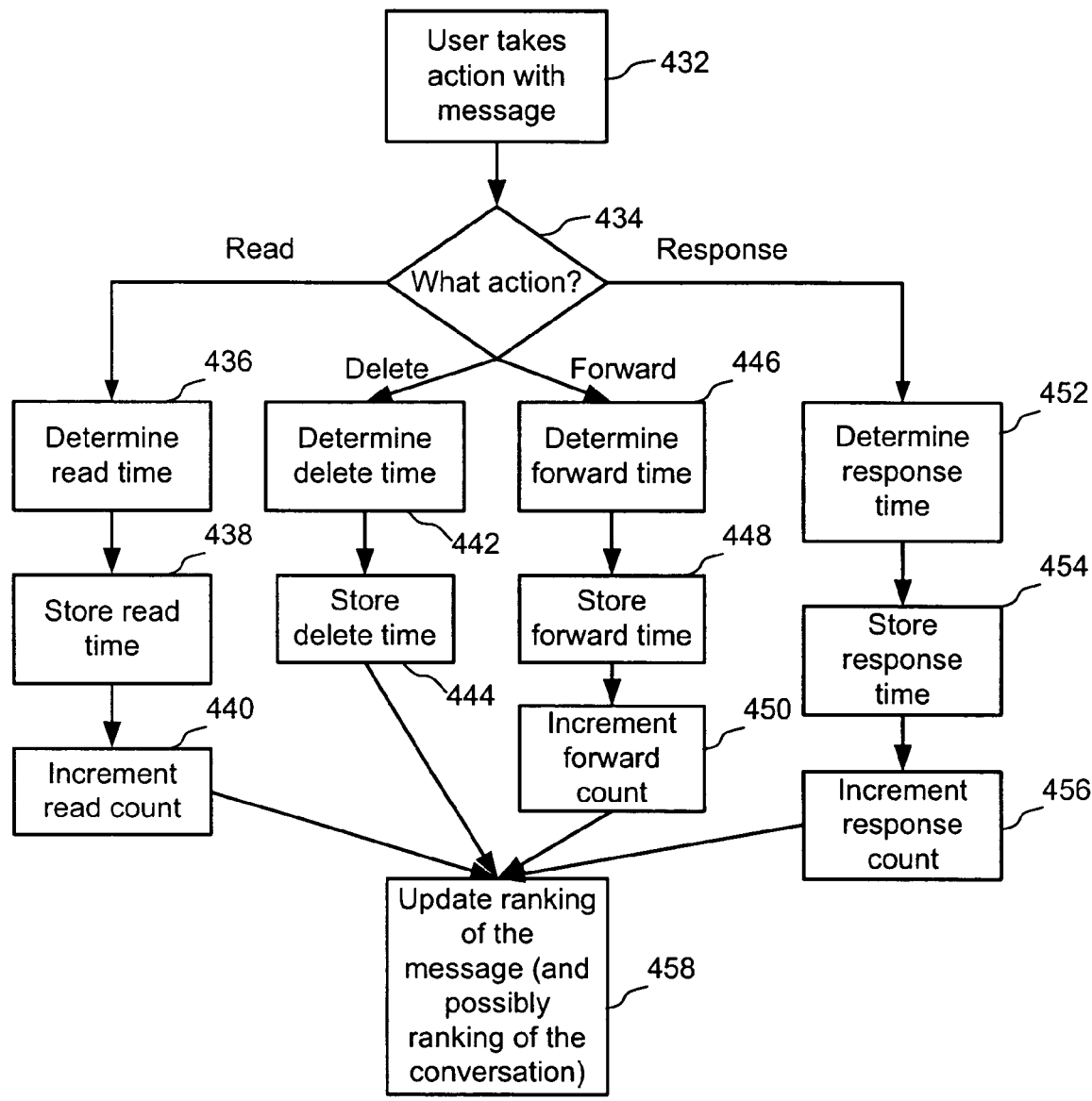

FIGS. 4A and 4B illustrate exemplary processes for determining interaction metrics for a message, and for determining ranking values for a message and for a conversation, according to some embodiments of the invention. The ranking value of a message is determined based on one or more interaction metrics. An interaction metric is a metric that is based on a predefined action performed by the user with regard to the message. The ranking value is a measure of the interest of an existing message to a user based on what actions the user performs with regard to the message and when the user performs the actions. In some embodiments, the ranking value of a message may be determined or updated after a user action with regard to the message. In some embodiments, the ranking value of a message may be determined or updated periodically or episodically. In the embodiments where updates are performed periodically, message server 104 may accumulate records of user actions with regard to a message and utilize the records to update the ranking value of the message at scheduled times or intervals. In addition, periodic updating of ranking values may be applied to other messages, such as messages for which the user has yet to take any action.

In FIG. 4A, the user performs an action with regard to a message directed to the user (402). The action may be any of one or more predefined actions. In the exemplary process illustrated in FIG. 4A, the predefined actions are opening the message for reading (or reading the message), responding to the message, forwarding the message to other users, and deleting the message.

If the user action is opening the message for reading (404—read), a read time is determined, if the opening for reading is the first such action (406). The read time is a time interval between when the message was received and when the user opened the message for reading. In other words, the read time is the difference between the time of receipt of the message and the time the message is opened for reading. Read times are not calculated for subsequent openings of the same message for reading. The read time is stored in a data structure (408).

In some embodiments, the user interface may show at least part of the contents of the message, e.g., in a preview window, without the user actually opening the message. The message server 104 may consider, or not, the message preview as an opening of the message for reading, for purposes of determining the read time and read count, depending on the environment.

If the user action is deleting the message (404—delete), a delete time is determined (410). The delete time is a time interval between when the message was received and when the user deleted the message. In other words, the delete time is the difference between the time of receipt of the message and the time the message is deleted. The delete time is stored in a data structure (412).

In some embodiments, the deletion of a message may be a two-step process; the first "deletion" of the message moves the message to a store of unwanted messages, e.g., a "trash," and the second "deletion," i.e., deletion of the message from the "trash," permanently deletes the message. Additionally, the message may be recovered before permanent deletion by moving the message out of the "trash." Thus, the message server 104 may determine the delete time from one or the other of the two deletion events described above. Furthermore, the message server 104 may reset the deletion time if the message is recovered from the "trash," as recovery from the trash may be an indication that the deletion was an accident rather than a reflection of the user's uninterest in the message or that the user had renewed interest in the message since the first deletion.

If the user action is forwarding the message to other users (404—forward), a forward time is determined, if the forward is the first such action (414). The forward time is a time interval between when the message was received to the user and when the user forwarded the message. In other words, the forward time is the difference between the time of receipt of the message and the time the message is forwarded. In some embodiments, forward times are not calculated for subsequent forwards of the same message, while in other embodiments multiple forward times are determined when a message is forwarded multiple times. The one or more forward times are stored in a data structure (416).

If the user action is responding to the message, e.g., by replying to the message (404—response), a response time is determined, if the response is the first such action (418). The response time is a time interval between when the message was received to the user and when the user responded to the message. In other words, the response time is the difference between the time of receipt of the message and the time the user responded to the message. In some embodiments, response times are not calculated for subsequent responses to the same message, while in other embodiments multiple response times are determined when a user makes multiple responses to a message. The one or more response times are stored in a data structure (420).

In some embodiments, the interaction metrics may be stored with the message to which the interaction metric is associated. In some embodiments, the interaction metrics may be stored, separately from the message itself, with an identifier of the message in a separate data structure. The identifier of the message and the associated interaction metrics may be maintained for some time even after the associated message has been deleted.

After the proper interaction metric(s) are determined, the ranking value of the message is calculated (422). The ranking value may be calculated by various methods that utilize the interaction metrics as the inputs, such as neural networks, support vector machines, decision trees, and other statistical learning procedures. One exemplary method for determining the ranking value, using the interaction metrics described above, is a linear combination. An example of a linear combination, using the interaction metrics described above, may be "(a*read time)+(b*delete time)+(c*forward time)+(d*response time)," where a, b, c, and d are all predefined coefficients (also called constants). In this example, a, c and d may be negative constants while d is a positive constant. In another example, the ranking value is a linear combination of the inverses of the interaction metrics: "(a÷read time)+(b÷delete time)+(c÷forward time)+(d÷response time)," where a, b, c, and d are predefined coefficients or constants. In this second example, a, c and d may be positive constants while b is a negative constant. More generally, the constants may be defined based on whether each interaction metric is a positive or a negative contribution to the ranking value of the message. The constants may also be defined based on how much weight is to be accorded to each interaction metric. In some embodiments, a larger ranking value is associated with a higher interest in the message.

As described above, in some embodiments, a sender of a message may set an importance level for the message. The sender specified importance level ("SSIL" in the equation shown below) may be taken into account when calculating the ranking value of the message. For example, the importance level may be converted to a value, based on a predefined scheme, and the value is utilized like any other interaction metric (metric$_j$) in the determination of the ranking value, as shown in the following exemplary equation $$\text{ranking value} = \sum_i \alpha_i \, metric_i + \beta \cdot SSIL$$

in which $\alpha_i$ and $\beta$ are predefined coefficients. Whether the importance level is accounted for when calculating the ranking value of a message, or ignored entirely, may be an option that the user may toggle (e.g., by setting $\beta$ in the above equation to zero or a non-zero value).

After the ranking value of the message is determined, if the message belongs to an existing conversation, a composite ranking value for the conversation may be determined or updated. In some embodiments, the composite ranking value of the conversation may be a weighted average of the ranking values of the messages belonging to the conversation, including the just-determined ranking value of the message. For example, the ranking values of the messages may be weighted based on the time of the respective message. One exemplary scheme for time-based weighting may be an exponential decay of the weight of a ranking value based on how long ago the message was received. In alternative embodiments, the composite ranking value of the conversation may be a simple average (arithmetic mean) of the ranking values of the messages belonging to the conversation. That is, each of the message ranking values has equal weight.

It should be appreciated that the determination of a composite ranking value for the conversation is similar to the determination of a composite ranking value for a set of similar messages, as described above in relation to FIG. 2; both involve determining a combination, where the combination may be weighted, using the ranking values of messages belonging to a predefined group. Furthermore, it should be appreciated that the weighting schemes described above are merely exemplary and alternative weighting schemes may be used.

It should be appreciated that, in some embodiments, such as the process described above in relation to FIG. 4A, certain interaction metrics, particularly the time-based metrics, need only be determined once, at the first user action associated with the respective interaction metric. For example, the read time need only be determined at the first opening of the message by the user for reading. In alternative embodiments, message server 104 may determine and store more than one interaction metric value for the same type of action in regard to the message. For example, message server 104 may determine a read time for each opening of the same message. In another example, message server 104 may determine a first read time and a count of the amount of time or number of times the user has read the same message.

FIG. 4B illustrates a process in which more than one interaction metric may be calculated for the same type of action. A user takes an action with regard to a message (432). If the action is an opening of the message for reading (434—read), a read time is determined (436), the read time is stored in a data structure (438), and a read count, which tracks the number of times the message has been opened for reading, is incremented by 1 (440). If the action is a delete of the message (434—delete), a delete time is determined (442) and stored in a data structure (444). If the action is forwarding of the message (434—forward), a forward time is determined (446), the forward time is stored in a data structure (448), and a forward count, which tracks the number of times the message has been forwarded, is incremented by 1 (450). If the action is responding to the message (434—response), a response time is determined (452), the response time is stored in a data structure (454), and a response count, which tracks the number of times the message has been responded to, is incremented by 1 (456). The ranking value of the message and/or conversation is updated (458). The ranking value of the message and/or the composite ranking value of the conversation may be calculated in a manner similar to that of step 422 of FIG. 4A, described above. The counts, multiplied by constants, may be additional terms in the linear combination described above, in relation to FIG. 4A. The one or more time values for a particular type of action may be mathematically combined (e.g., simple average, etc.) to get one value for input into the linear combination described above. In the process of FIG. 4B, there may be more than one time-based metric value for a particular type of action or for each of a plurality of types of actions (e.g., read actions and forward actions). It should be appreciated that in some embodiments, one time metric value may be determined for some actions and multiple times may be determined for other actions. For example, there may be just one read time but many response times and forward times for a message.

The interaction metrics described above are based on predefined actions that give an indication of the user's level of interest with respect to a certain message. In other words, the user actions with regard to a message serve as an indication of the user's interest in that message. For example, a short read time, i.e., the user opens the message for reading soon after receipt, may be an indication that the user is interested in the contents of the message and/or is interested in all messages from the sender of the message. A short delete time, i.e., the user deletes the message soon after delivery, may be an indication that a user is uninterested in the contents of the message and/or is uninterested in all messages from the sender of the message. However, it should be appreciated that the predefined actions and the associated interaction metrics described above are merely exemplary and that any combination of predefined actions and associated interaction metrics may be used. For example, the list of predefined actions may be one or more of the actions selected from the group consisting of: opening the message for reading, forwarding the message, responding to the message, deleting the message, archiving the message, moving a message to a folder, labeling the message, and flagging the message manually. If the action is opening a message for reading, the metrics may include one or more read times, one or more times elapsed while the message is open (which may or may not be normalized based on message length), and a read count. If the action is deleting a message, the metrics may include a time between receipt and deletion (delete time), and a time between the first opening of the message and the deletion. If the action is responding to the message, the metrics may include one or more response times (measured from time of message receipt), a response count, and one or more times between an opening of the message for reading and a response to the message. If the action is forwarding the message, the metrics may include one or more forward times (measured from time of message receipt), a forward count, the number of users to which the message has been forwarded, and one or more times between an opening of the message and a forward of the message. In other embodiments, the metrics for these actions may include a subset of the above-identified metrics, and may also include additional metrics.

The interaction metrics may also be refined to account for the fact that the user does not have access to his electronic messages all the time. The interaction metrics that are based on time, e.g., the read time, delete time, etc., may be refined based on the time elapsed during which the messages are actually accessible and/or visible to the user. For example, the read time may be adjusted to count only the time elapsed when the user is logged in, when the electronic messaging program is open, and/or when the message is visible in the client application 103. Adjusting the time prevents situations where time during which the message is not accessible and/or visible to the user imposes a "penalty" on the ranking value of a message.

When determining a ranking value for a message, one or more interaction metrics may not be available because the user has not performed particular actions. For example, a message would not have a delete time if the message has not been deleted yet. Under such circumstances, the message server 104 may use default values for the metrics. For example, for the time-based metrics, the default value may be the time interval between receipt of the message and the current time, i.e., the difference between the time of receipt and the current time. In other words, the value for time-based metric will simply be the total time elapsed since receipt of the message. For the count-based metrics, the default value for the count may be 0. In some embodiments, if the user has not performed any action at all with regard to a message and a ranking value of the message is needed for determining a composite ranking value of a conversation or a set of similar messages, message server 104 may use a default ranking value for the message or use the assigned ranking value assigned to the message at receipt as substitutes.

Figure 5:
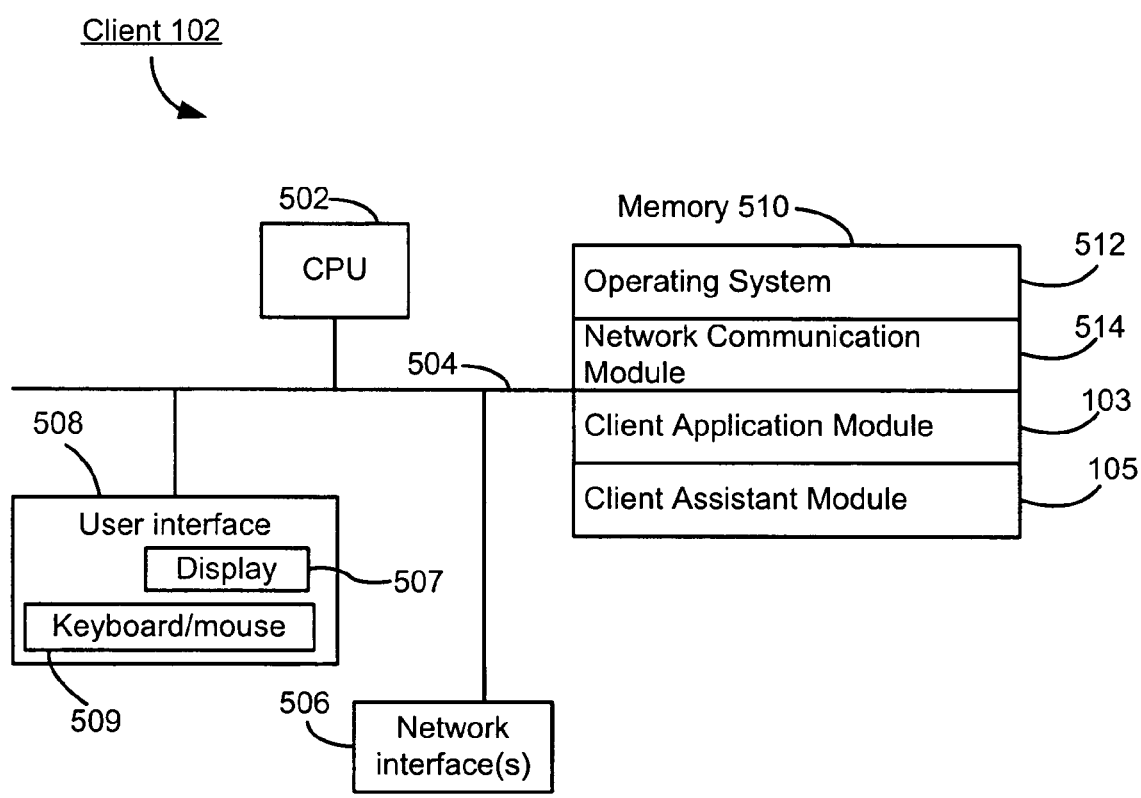
FIG. 5 is a block diagram illustrating an exemplary client, according to some embodiments of the invention.

FIG. 5 illustrates an exemplary client 102, according to some embodiments of the invention. Client 102 includes: at least one data processor or central processing unit (CPU) 502; memory 510; one or more network interfaces 506 for coupling the client with and communicating with other clients and the message server in the network environment of FIG. 1 via the communication network(s) 106; and at least one bus 504 that interconnects these components. Each client may also include one or more user interface devices 508, such as a monitor display 507 and a keyboard/mouse 509. In some embodiments, one or more of the clients in the system includes a subset and/or superset of the aforementioned components.

The memory 510 includes high-speed random access memory and may include non-volatile memory, such as one or more magnetic disk storage devices. In some embodiments, the memory 510 may include mass storage that is remotely located from the central processing unit(s) 502. The memory 510 stores an operating system 512 that includes procedures for handling basic system services and for performing hardware dependent tasks. Memory 510 also stores a network communication module or instructions 514 used for communicating with other clients and the message server on the network environment of FIG. 1. The term "instructions" is used in this document to mean computer program instructions or code executable by a processor, such as CPU 502.

The memory 510 also stores the following data structures, programs and instructions, or a subset or superset thereof:
- client application 103, for providing an interface for the user to interact with electronic messages; and
- client assistant 105, for providing assistance to client 102 in the performance of certain tasks.

FIG. 6 illustrates an exemplary message server 104, according to some embodiments of the invention. Message server 104 includes: at least one data processor or central processing unit (CPU) 602; memory 610; network interface(s) 606 for coupling the message server with and communicating with clients and other message servers in the network environment of FIG. 1 via the communication network(s) 106; and at least one bus 604 that interconnects these components. Each message server may also include one or more user interface devices 608, such as a monitor display 607 and a keyboard/mouse 609. In some embodiments, one or more of the servers in the system includes a subset and/or superset of the aforementioned components.

The memory 610 includes high-speed random access memory and may include non-volatile memory, such as one or more magnetic disk storage devices. In some embodiments, the memory 610 may include mass storage that is remotely located from the central processing unit(s) 602. The memory 610 stores an operating system 612 that includes procedures for handling basic system services and for performing hardware dependent tasks. Memory 610 also stores a network communication module or instructions 614 used for communicating with clients and other message servers on the network environment of FIG. 1.

The memory 610 also stores the following data structures, programs and instructions, or a subset or superset thereof:
- message repository 616, for storing messages, conversations, and associated interaction metrics and ranking values;
- ranking table 618, for storing message and/or conversation identifiers and associated interaction metrics and ranking values;
- message ranking module (or instructions) 620, for identifying ranking values, and determining interaction metrics and ranking values of messages, message conversations, and sets of similar messages; and
- new message processing module (or instructions) 622, for finding messages similar to a new message, sorting messages, and marking messages.

Message repository 616 stores messages, conversations, and associated interaction metrics and ranking values. The messages, conversations, metrics and ranking values may be stored in data structures such as the tables shown in FIGS. 6B and 6C. In FIG. 6B, table 624 stores one or more conversations 625. Within each conversation are: a conversation identifier 626, a conversation composite ranking value 627, one or more messages 628, interaction metric values 629 associated with each respective message in the conversation, and a ranking value 630 associated with each respective message in the conversation. As discussed below, in some embodiments a ranking value is also associated with and stored for each conversation. Messages not grouped into conversations or not belonging to any conversation may be stored in a data structures such as table 631, shown in FIG. 6C. Table 631 stores one or more messages 632, interaction metric values 633 associated with each respective message, and ranking values 634 associated with each respective message.

In some embodiments, the interaction metric values and ranking values of messages and conversations may be stored separately from the message, in data structures such table 635 (shown in FIG. 6D) and table 638 (shown in FIG. 6E). The table 635 includes one or more conversation identifiers 636 and composite ranking values 637 associated with each respective conversation identifier. Table 638 includes one or more message identifiers 639, interaction metric values 640 associated with each respective message identifier, and ranking values 641 associated with each respective message identifier.

Figure 6A:
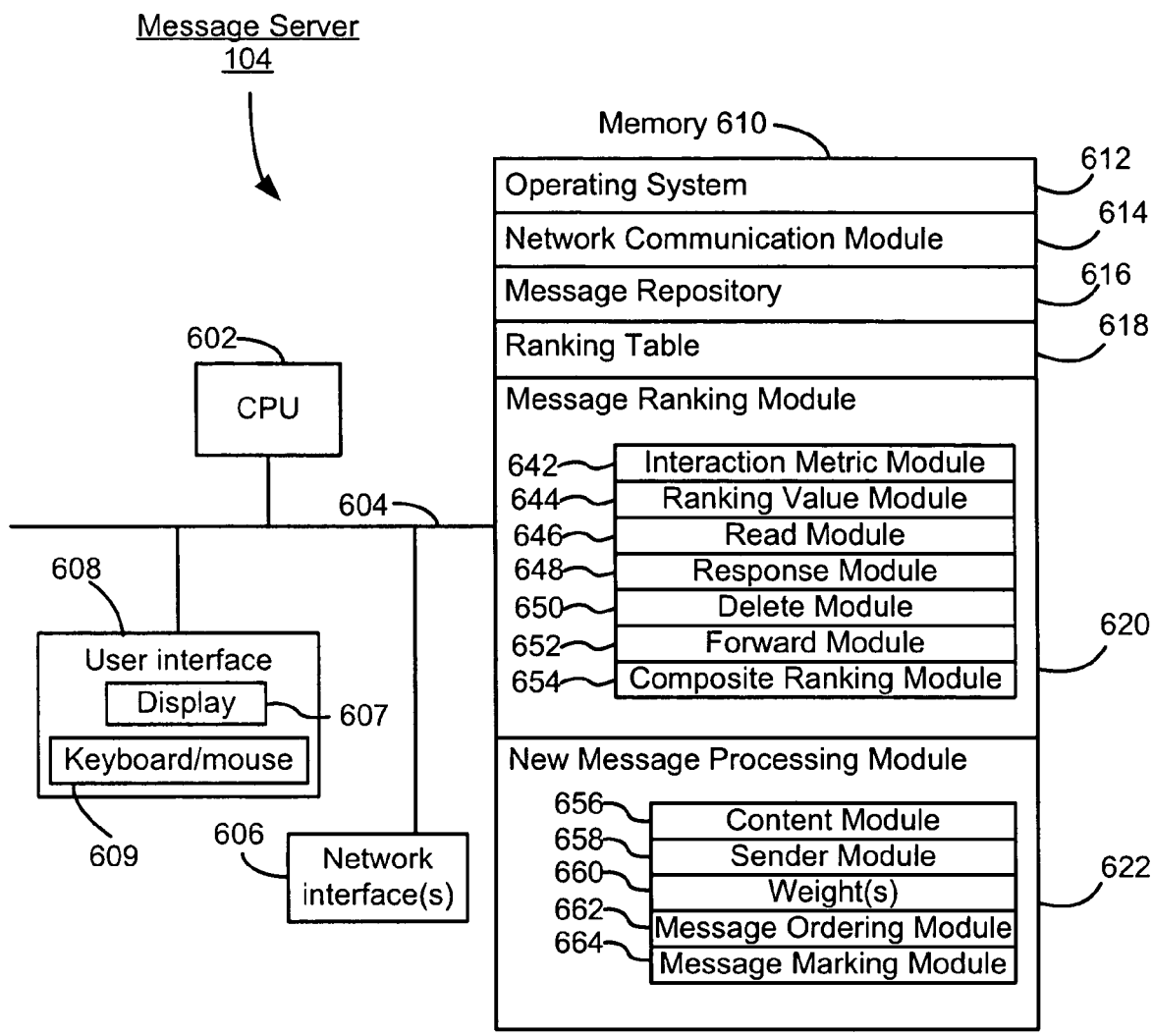
FIG. 6A is a block diagram illustrating an exemplary message server, according to some embodiments of the invention

Message ranking module (or instructions) 620 determine interaction metric values of messages. Using those interaction metric values, message ranking module 620 determines ranking values of messages, and using the ranking values of messages, determines ranking values of conversations or sets of similar messages. Message ranking module 620 may include one or more sub-modules. For example, as shown in FIG. 6A, message ranking module 620 may include
- interaction metric module 642 for determining an interaction metric value, associated with a predefined user action, for a message;
- ranking value module (or instructions) 644 for determining ranking values of messages from interaction metrics;
- read module (or instructions) 646 for determining the read time and read count for a message;
- response module (or instructions) 648 for determining the response time and response count for a message;
- delete module (or instructions) 650 for determining the delete time for a message;
- forward module (or instructions) 652 for determining the forward time and forward count for a message; and
- composite ranking module (or instructions) 654 for determining ranking values for conversations and sets of similar messages.

It should be appreciated that read module 646, response module 648, delete module 650, and forward module 652 are modules or instructions for determining the interaction metric values associated with particular user actions; they may be sub-modules of interaction metric module 642.

New message processing module or instructions 622 finds similar messages for a new message, orders messages, and marks messages. New message processing module 622 may include one or more sub-modules. For example, new message processing module 622 may include content module or instructions 656 for finding messages that are similar to a new message based on content, sender module or instructions 658 for finding messages that are similar to a new message based on a same sender, weights(s) 660 for holding data relevant to the weighting of messages when calculating ranking values; message ordering module or instructions 662 for ordering (or sorting) messages based on ranking values, and message marking module or instructions 664 for marking messages with ranking values above a predefined ranking threshold.

Each of the above identified modules or procedures correspond to a set of instructions for performing a function described above. These modules (i.e., sets of instructions) need not be implemented as separate software programs, procedures or modules, and thus various subsets of these modules may be combined or otherwise re-arranged in various embodiments. In some embodiments, memory 610 may store a subset of the modules and data structures identified above. Furthermore, memory 610 may store additional modules and data structures not described above.

Although FIG. 6 shows message server 104 as a number of discrete items, FIG. 6 is intended more as a functional description of the various features which may be present in message server 104 rather than as a structural schematic of the embodiments described herein. In practice, and as recognized by those of ordinary skill in the art, items shown separately could be combined and some items could be separated. For example, some items shown separately in FIG. 6 could be implemented on single servers and single items could be implemented by one or more servers. The actual number of servers in message server 104 and how features are allocated among them will vary from one implementation to another, and may depend in part on the amount of data traffic that the system must handle during peak usage periods as well as during average usage periods.

The embodiments described above assume a web mail interface, where message server 104 performs operations on messages, including determining interaction metrics for messages, ranking messages, and sorting/marking the messages. However, in embodiments where the client application 103 is an electronic messaging program and operations on messages may be performed at the client-side, some tasks that would be performed by message server 104 in the web mail embodiments may be performed by the electronic messaging program 103 and/or client assistant 105. For example, interaction metrics may be determined by the electronic messaging program 103 and/or client assistant 105 and stored locally, at the client 102. The electronic messaging program 103 and/or client assistant 105 would determine ranking values for the messages. The electronic messaging program 103 and/or client assistant 105 would be responsible for analyzing the messages and grouping messages by conversation and/or similarity. The electronic messaging program 103 and/or client assistant 105 would also be responsible for sorting and/or marking the messages. Furthermore, at least a subset of the data structures and/or modules (or instructions) described above in relation to FIG. 6 may be located on client 102.

A further feature of some embodiments of the invention includes override rules. The override rules may give messages from particular senders or messages about particular topics a predefined high ranking value, regardless of what actions the user performed with regard to the message. The override rules may be set by the user or learned by the system through analysis of user action patterns over time. For example, the system can learn that the user always favors messages from a particular sender. In response, the system can give future messages from that particular sender a high ranking value, so that messages from that particular sender are always made more prominent. Techniques such as version spaces may be used for the learning process.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A method comprising: on a message server computer having one or more processors and memory, for each conversation i in a plurality of n conversations (i=1, . . . , n), wherein each conversation i includes messages, wherein the messages include messages received by a user:

determining a respective received message ranking value $v_j$ for each received message in the conversation, wherein:

the respective received message ranking value $v_j$ is a function of at least one interaction metric $m_k$ for the respective received message:

$v_j = f(m_k)$, wherein $m_k$ is a value of the interaction metric for a k-th interaction metric, and the interaction metric $m_k$ is based on a predefined action performed by the user with regard to the respective received message; and determining a conversation ranking value $r_i$ for the conversation, wherein the conversation ranking value $r_i$ is a function of received message ranking values $v_j$ for all of the received messages in the conversation:

$r_i = f(v_j)$, (j=1, . . . , m), wherein $r_i$ is the conversation ranking value for an i-th conversation in the plurality of n conversations, and $v_j$ is the message ranking value for a j-th received message in the plurality of m received messages in the i-th conversation; and sorting the conversations in the plurality of n conversations in accordance with the determined conversation ranking values $r_i$, (i=1, . . . , n).

2. The method of claim 1, wherein the messages in a respective conversation include email messages.

3. The method of claim 1, wherein determining at least one interaction metric for a respective received message comprises determining a length of time between a time of receipt of the received message and a time that the user performs a predefined action with respect to the received message.

4. The method of claim 3, wherein the predefined action includes one of: deleting the received message, responding to the received message, forwarding the received message, and reading the received message.

5. The method of claim 1, wherein said determining at least one interaction metric for a respective received message comprises determining a number of times the user has performed a predefined action with respect to the received message, wherein the predefined action includes one of: responding to the received message, forwarding the received message, and reading the received message.

6. The method of claim 1, wherein each received message is assigned a respective received message ranking value $v_j$ based on a weighted average of a plurality of p interaction metrics for the received message:

$$v_j = \sum_{k=1}^{p} ((\alpha_k m_k)/p),$$

wherein $m_k$ is a value of the interaction metric for a k-th interaction metric in the plurality of p interaction metrics, and $\alpha_k$ are respective weights for respective interaction metrics.

7. The method of claim 1, including assigning the respective received message ranking value to a message in accordance with a linear combination of the interaction metrics for the message:

$$v_j = \sum_{k=1}^{p} \alpha_k m_k,$$

wherein
- $m_k$ is a value of the interaction metric for a k-th interaction metric in the plurality of p interaction metrics, and
- $\alpha_k$ are respective weights for respective interaction metrics.

8. The method of claim 1, wherein sorting the conversations in the plurality of conversations includes ordering the conversations in the plurality of conversations in accordance with the determined conversation ranking values.

9. A computer system for ordering a plurality of conversations, the system, comprising:
- one or more processors;
- memory;
- a new message processing module to order a plurality of n conversations, each conversation i (i=1, ..., n) including messages, wherein the messages include messages received by a user; and
- a message ranking module to determine a respective received message ranking value $v_j$ for each received message in the conversation, wherein:
  - the respective received message ranking value $v_j$ is a function of at least one interaction metric $m_k$ for the respective received message:

$v_j = f(m_k)$, wherein
  - $m_k$ is a value of the interaction metric for a k-th interaction metric and
  - the interaction metric $m_k$ is based on at least one predefined action performed by the user with regard to the respective received message; and
- a conversation ranking module to determine a conversation ranking value $r_i$ of the conversation, wherein the conversation ranking value $r_i$ is a function of received message ranking values $v_j$ for all of the received messages in the conversation:

$r_i = f(v_j), (j=1, \ldots, m)$, wherein
  - $r_i$ is the conversation ranking value for an i-th conversation in the plurality of n conversations, and
  - $v_j$ is the message ranking value for a j-th received message in the plurality of m received messages in the i-th conversation.

10. The computer system of claim 9, wherein the message ranking module includes instructions to determine a length of time between a time of receipt of a respective received message and a time that the user performs a predefined action with respect to the received message, wherein the predefined action includes one of: deleting the received message, forwarding the received message, reading the received message, and responding to the received message.

11. The computer system of claim 9, wherein the message ranking module includes instructions to determine a number of times the user has performed a predefined action with respect to a respective received message, wherein the predefined action includes one of: responding to the received message, forwarding the received message, and reading the received message.

12. The computer system of claim 9, wherein the message ranking module includes instructions to assign a message ranking value $v_j$ to each received message based on a weighted average of a plurality of p interaction metrics for the received message:

$$v_j = \sum_{k=1}^{p} ((\alpha_k m_k)/p),$$

wherein
- $m_k$ is a value of the interaction metric for a k-th interaction metric in the plurality of p interaction metrics, and
- $\alpha_k$ are respective weights for respective interaction metrics.

13. The computer system of claim 9, wherein the message ranking module includes instructions to assign a message ranking value to a respective message in accordance with a linear combination of the interaction metrics of the message:

$$v_j = \sum_{k=1}^{p} \alpha_k m_k,$$

wherein
- $m_k$ is a value of the interaction metric for a k-th interaction metric in the plurality of p interaction metrics, and
- $\alpha_k$ are respective weights for respective interaction metrics.

14. A computer readable storage medium and one or more computer programs embedded therein, the one or more computer programs comprising instructions, which when executed by a computer system, cause the computer system to:
- for each conversation i in a plurality of n conversations (i=1, ..., n), wherein each conversation i includes messages, wherein the messages include messages received by a user:
  - determine a respective received message ranking value $v_j$ for each received message in the conversation, wherein:
    - the respective received message ranking value $v_j$ is a function of at least one interaction metric $m_k$ for the respective received message:

$v_j = f(m_k)$, wherein
    - $m_k$ is a value of the interaction metric for a k-th interaction metric, and
    - the interaction metric $m_k$ is based on a predefined action performed by the user with regard to the respective received message; and
  - determine a conversation ranking value $r_i$ for the conversation, wherein the conversation ranking value $r_i$ is a function of received message ranking values $v_j$ for all of the received messages in the conversation:

$r_i = f(v_j), (j=1, \ldots, m)$, wherein
    - $r_i$ is the conversation ranking value for an i-th conversation in the plurality of n conversations, and
    - $v_j$ is the message ranking value for a j-th received message in the plurality of m received messages in the i-th conversation; and sort the conversations in the plurality of n conversations in accordance with the determined conversation ranking values $r_i$, (i=1, ..., n).

15. A computer system, comprising:
one or more processors;
memory; and
one or more programs, wherein the one or more programs are stored in the memory and configured to be executed by the one or more processors, the one or more programs including:
for each conversation i in a plurality of n conversations (i=1, ..., n), wherein each conversation i includes messages, wherein the messages include messages received by a user:
instructions for determining a respective received message ranking value $v_j$ for each received message in the conversation, wherein:
the respective received message ranking value $v_j$ is a function of at least one interaction metric $m_k$ for the respective received message:

$v_j = f(m_k)$, wherein $m_k$ is a value of the interaction metric for a k-th interaction metric, and
the interaction metric $m_k$ is based on a predefined action performed by the user with regard to the respective received message; and
instructions for determining a conversation ranking value $r_i$ for the conversation, wherein the conversation ranking value $r_i$ is a function of received message ranking values $v_j$ for all of the received messages in the conversation:

$r_i = f(v_j)$, (j=1, ..., m), wherein $r_i$ is the conversation ranking value for an i-th conversation in the plurality of n conversations, and
$v_j$ is the message ranking value for a j-th received message in the plurality of m received messages in the i-th conversation; and instructions for sorting the conversations in the plurality of n conversations in accordance with the determined conversation ranking values $r_i$, (i=1, ..., n).

16. The method of claim 1, wherein each received message ranking value $v_j$ is a function of a plurality of p interaction metrics for the corresponding received message:

$v_j = f(m_k)$ wherein $v_j$ is the message ranking value for a j-th received message in the plurality of m received messages in the i-th conversation, and
$m_k$ is a value of the interaction metric for a k-th interaction metric in the plurality of p interaction metrics.

17. The method of claim 1, wherein the received message ranking values $v_j$ are weighted based on receipt times of the received messages in the conversation.

18. The method of claim 1, wherein the conversation ranking value $r_i$ is a linear combination of the received message ranking values $v_j$ for all of the received messages in the conversation:

$$r_i = \sum_{j=1}^{m} \beta_j v_j$$

wherein
$r_i$ is the conversation ranking value for an i-th conversation in the plurality of n conversations,
$v_j$ is the message ranking value for a j-th received message in the plurality of m received messages in the i-th conversation, and
$\beta_j$ is the respective weight for a j-th message in the plurality of m received messages in the i-th conversation.

19. The method of claim 1, wherein the conversation ranking value is a weighted average of the received message ranking values for all of the received messages in the conversation:

$$r_i = \sum_{j=1}^{m} ((\beta_j v_j)/m)$$

wherein
$r_i$ is the conversation ranking value for an i-th conversation in the plurality of n conversations,
vj is the message ranking value for a j-th received message in the plurality of m received messages in the i-th conversation, and
$\beta_j$ is the respective weight for a j-th message in the plurality of m received messages in the i-th conversation.

20. The method of claim 1, wherein the conversation ranking value is an arithmetic mean of the received message ranking values $v_j$ for all of the received messages in the conversation:

$$r_i = \sum_{j=1}^{m} (v_j)/m$$

wherein
$r_i$ is the conversation ranking value for an i-th conversation in the plurality of n conversations, and
$v_j$ is the message ranking value for a j-th received message in the plurality of m messages in the i-th conversation.

21. The method of claim 7, wherein a respective weight $\alpha_k$ for a respective interaction metric decreases with time based on how long ago a respective message was received.

22. The method of claim 21, wherein $\alpha_k \propto 1/t$, where t is the time since the respective message was received.

23. The method of claim 18, wherein a respective weight $\beta_j$ for a respective received message decreases with time based on how long ago the respective message was received.

24. The method of claim 23, wherein $\beta_j \propto 1/t$, where t is the time since the respective message was received.

25. The method of claim 23, wherein the respective weight $\beta_j$ exponentially decays over time based on how long ago the respective message was received.

* * * * *